United States Patent [19]
Lin

[11] Patent Number: 5,904,347
[45] Date of Patent: May 18, 1999

[54] DEVICE FOR TURNING LONG MEMBERS

[76] Inventor: Tsann-Hwang Lin, 44-6, Chiang-Tzy-Ke, Heh-Ping Village, Chu-Chi Hsiang, Chia-Yi Hsien, Taiwan

[21] Appl. No.: 08/887,602

[22] Filed: Jul. 3, 1997

[51] Int. Cl.$^6$ .................................................... B23Q 1/25
[52] U.S. Cl. ................................ 269/76; 269/69; 269/296
[58] Field of Search ............................... 269/76, 69, 296, 269/289 MR, 71

[56] References Cited

U.S. PATENT DOCUMENTS

| | | | |
|---|---|---|---|
| 2,320,079 | 5/1943 | Hartwig | 269/69 |
| 4,491,307 | 1/1985 | Ellefson | 269/76 |

Primary Examiner—Timothy V. Eley
Assistant Examiner—Benjamin M. Halpern
Attorney, Agent, or Firm—Larson & Taylor

[57] ABSTRACT

A device for turning long members includes two spaced bases each including two spaced vertical plates mounted on a top side thereof. A number of wheels are rotatably, mounted between the plates and located on a common circumference. Each wheel includes an annular groove defined therein. Two receiving discs are respectively, rotatably held by the wheels on the associated bases. Each receiving disc includes a first half disc and a second half disc which are releasably assembled together. The first half disc includes a peripheral edge received in the grooves of the associated wheels. Each of the first half disc and the second half disc includes a cutout for receiving a long member.

3 Claims, 4 Drawing Sheets

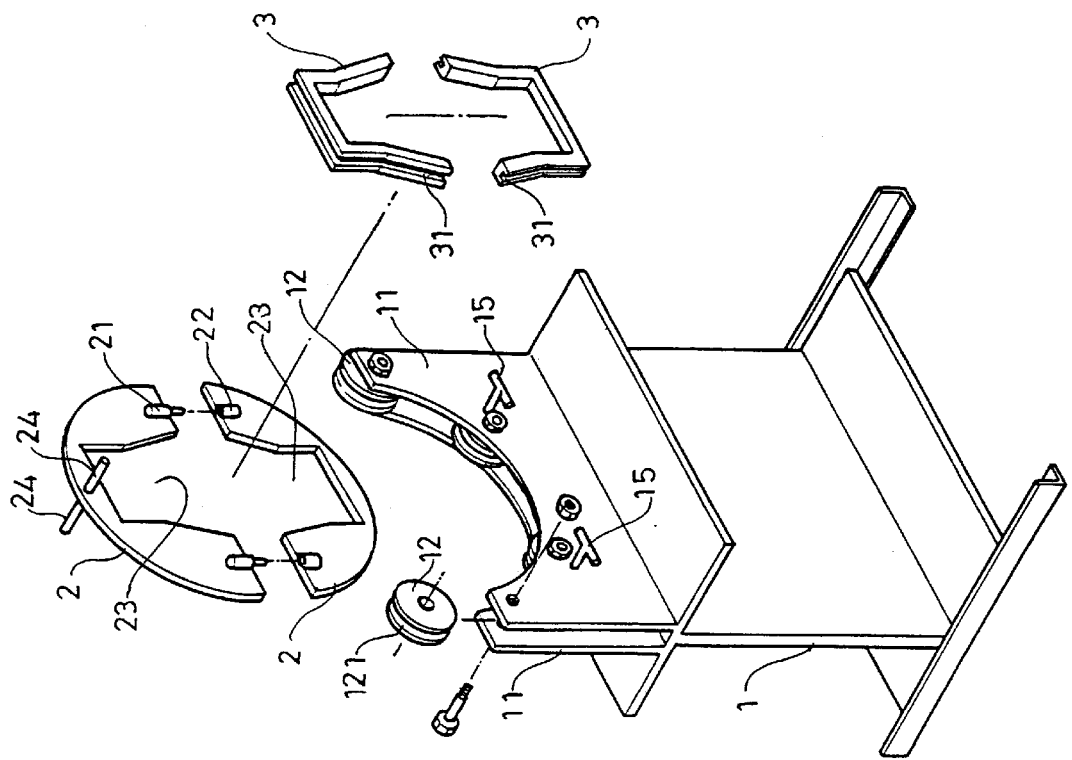
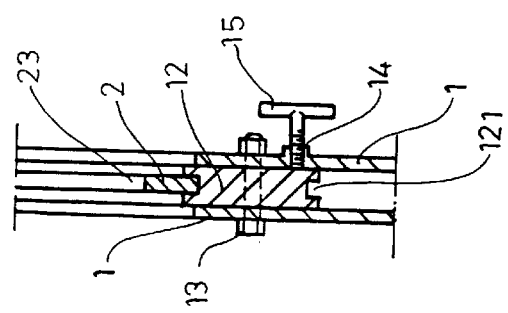

DEVICE FOR TURNING LONG MEMBERS

BACKGROUND OF THE INVENTION

The present invention relates to a device for turning long members for proceeding with processing, e.g., soldering on the long members.

Processing on long, bulky members are difficult as sometimes rotation of the members are required during processing. The present invention is intended to provide a device to solve this problem.

SUMMARY OF THE INVENTION

A device for turning long members in accordance with the present invention comprises two spaced bases each including two spaced vertical plates mounted on a top side thereof. A plurality of wheels are rotatably mounted between the plates and located on a common circumference. Each wheel includes an annular groove defined therein.

Two receiving discs are respectively, rotatably held by the wheels on the associated bases. Each receiving disc includes a first half disc and a second half disc which are releasably assembled together. The first half disc includes a peripheral edge received in the grooves of the associated wheels. Each of the first half disc and the second half disc includes a cutout for receiving a long member.

The disc may include a handle member mounted thereon. The plate may include a plurality of holes defined therein, and a plurality of stop members are releasably extended through the holes to prevent rotation of the wheels. A lining member is releasably mounted to each cutout. Each lining member includes a recess defined in an outer side thereof for engaging with a peripheral edge which defines the associated cutout.

Other objects, advantages, and novel features of the invention will become more apparent from the following detailed description when taken in conjunction with the accompanying drawings.

BRIEF DESCRIPTION OF THE DRAWINGS

FIG. 5 is a sectional view taken along line 5—5 in FIG. 4; and

FIG. 6 is an exploded perspective view illustrating a modified embodiment of the turning device.

DESCRIPTION OF THE PREFERRED EMBODIMENTS

Figure 1:
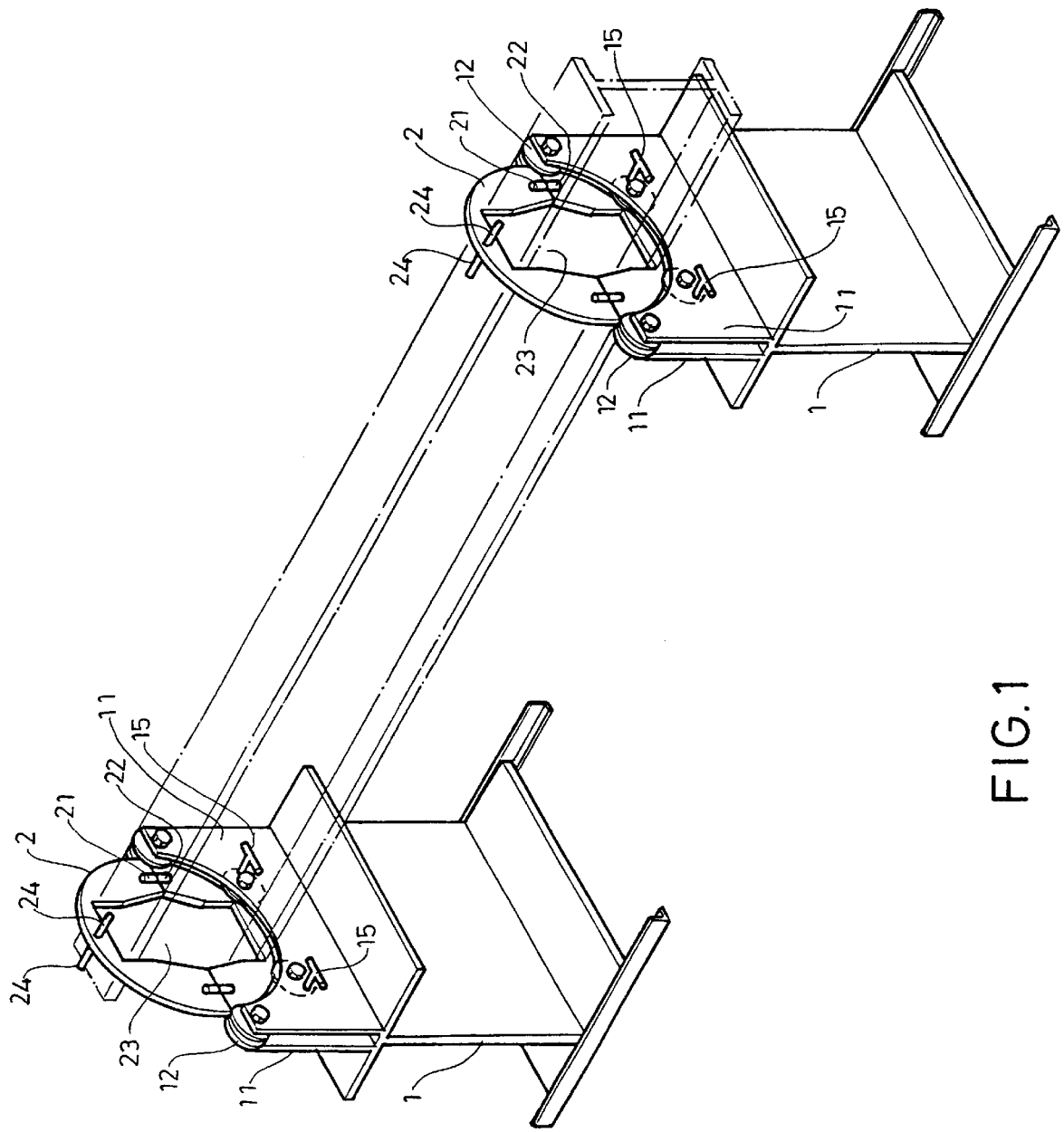
FIG. 1 is a perspective view of a device for turning long members in accordance with the present invention.
Figure 2:
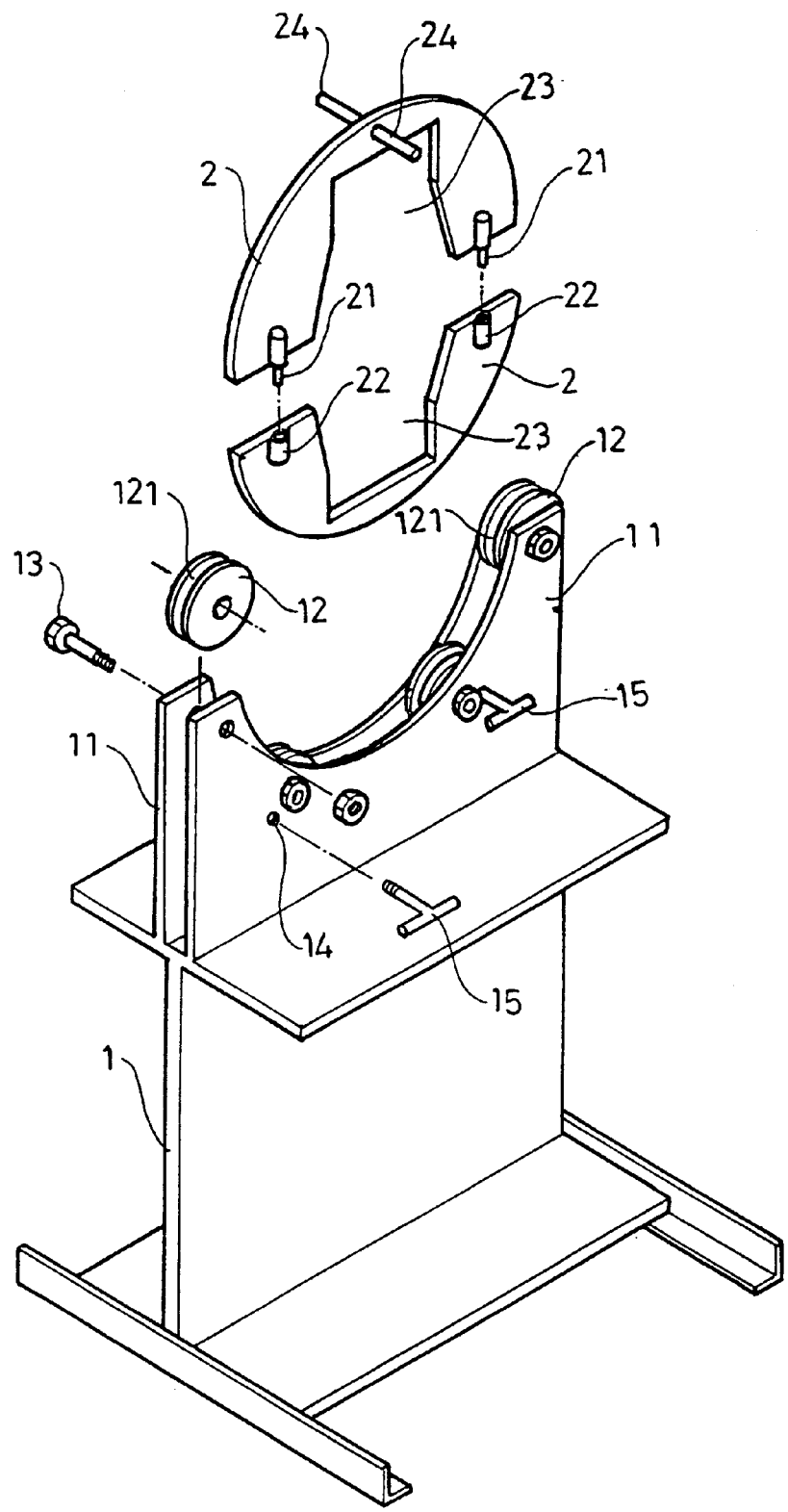
FIG. 2 is an exploded perspective view illustrating a half structure of the turning device in accordance with the present invention.

Referring to the drawings and initially to FIGS. 1 and 2, a device for turning long members in accordance with the present invention generally includes two spaced bases 1 each having a receiving disc 2 rotatably mounted thereon. Each base 1 is securely mounted on the ground and includes two spaced vertical plates 11 mounted on a top side thereof. A plurality of wheels 12 are rotatably mounted between the plates 11 and located on a common circumference. Each wheel 12 includes an annular groove 121 (FIG. 2) defined therein. In addition, holes 14 (preferably screw holes) are defined in the plates 11 through which stop members 15 may extend. In this embodiment, each stop member 15 may include a threaded end which may be inserted through the associated screw hole 14 to frictionally engage with the associated wheel 12.

The receiving disc 2 includes two half discs which are releasably assembled by means of, e.g, pins 21 and pin holes 22, best shown in FIG. 2. A peripheral edge of the disc 2 is received in the grooves 121 of the wheels 12. More specifically, the disc 2 is rotatably held by the wheels 12. Each half disc includes a cutout 23, which will be described later. One of the half discs includes a handle member 24 mounted thereon for easy grasping.

Figure 3:
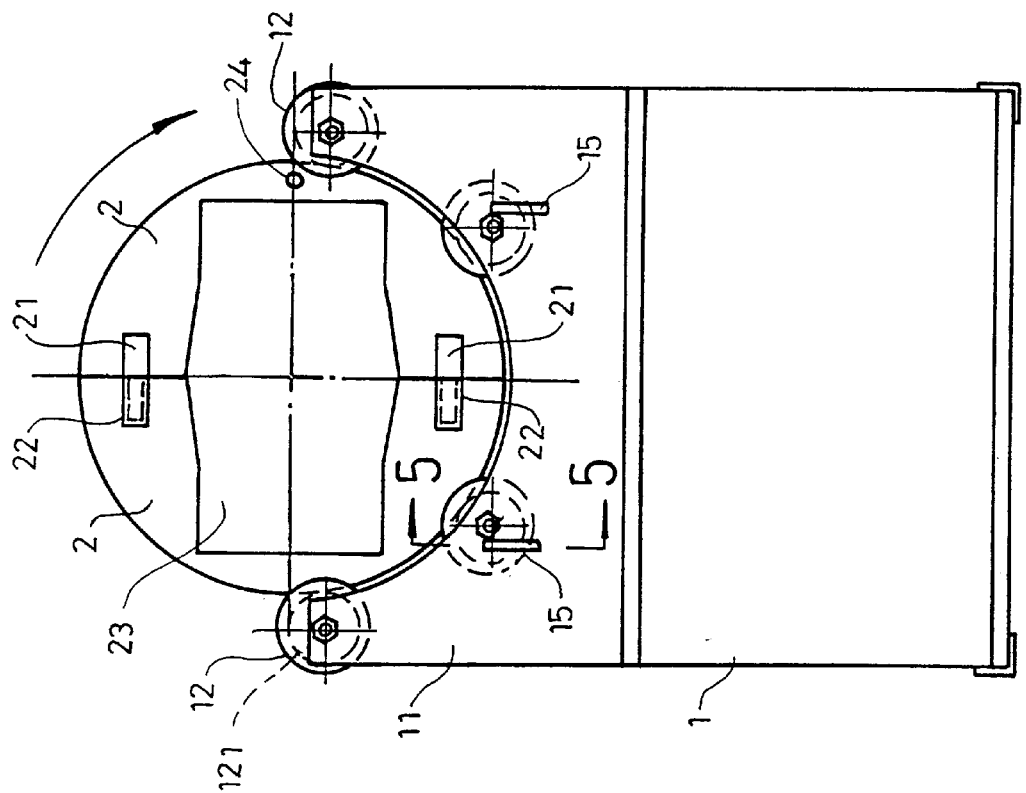
FIGS. 3 and 4 are side views illustrating operation of the turning device.
Figure 4:
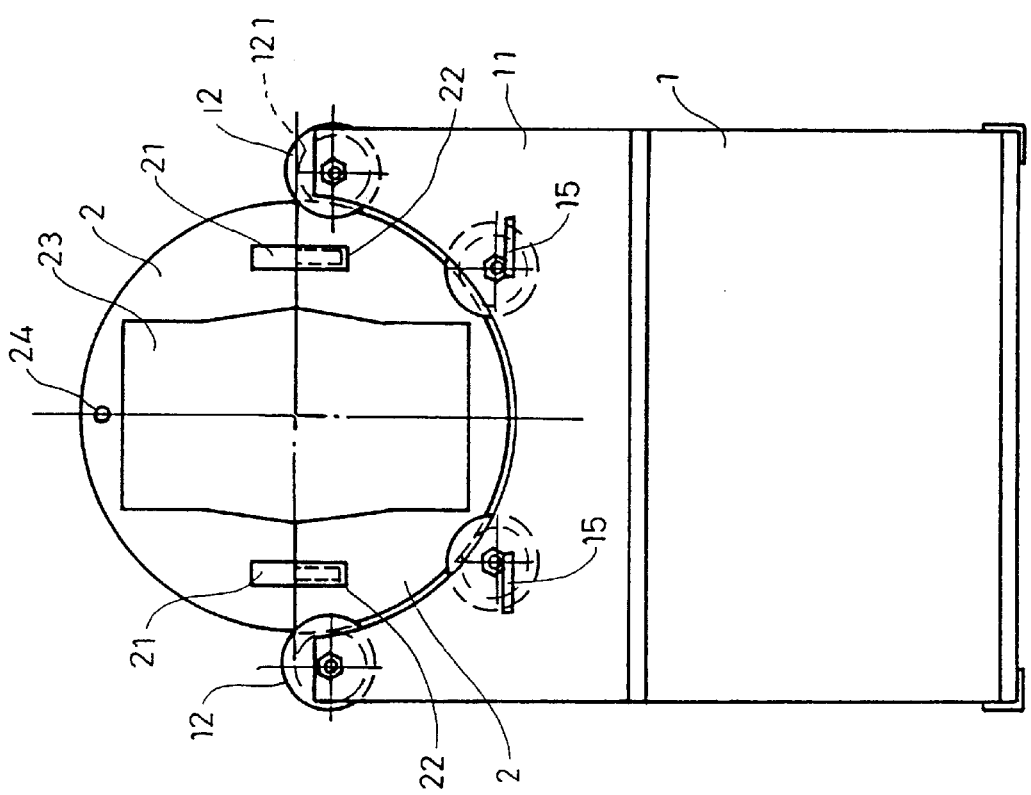

In use, two ends of a long member (not shown) are respectively inserted into the cutouts 23 of the half discs (lower ones) which are already held by the wheels 12, and the other half discs (upper ones) are then respectively engaged with the half discs held by the wheels 12, as shown in FIG. 3. It is appreciated that the centers of the two discs 2 are at the same level. Then, the discs 2 as well as the long member are rotated through a desired angle (FIG. 4), and the stop members 15 are inserted into the associated holes 14 to prevent rotation of the wheels 12 and the discs 2, as shown in FIG. 5. The long member is now ready for processing, e.g., soldering.

When the long member is reduced in the width and height, a lining member 3 can be inserted into each cutout 23 to reduce the size of the cutout 23. As shown in FIG. 6, each lining member 3 includes a recess 31 defined in an outer side thereof for engaging with a peripheral edge which defines the associated cutout 23.

According to the above description, it is appreciated that the turning device is compact and simple in structure and can be used to hold long members of different widths and heights.

Although the invention has been explained in relation to its preferred embodiment, it is to be understood that many other possible modifications and variations can be made without departing from the spirit and scope of the invention as hereinafter claimed.

What is claimed is:

1. A device comprising:
    two spaced apart bases each including two spaced vertical plates mounted on a top side thereof, a plurality of wheels being rotatably mounted between the plates and located on a common circumference, each said wheel including an annular groove defined therein,
    two receiving discs respectively, rotatably held by the wheels on the associated bases, each said receiving disc including a first half disc and a second half disc which are releasably assembled together, the first half disc including a peripheral edge received in the grooves of the associated wheels, each of the first half disc and the second half disc including a cutout adapted to receive a member and
    a lining member releasably mounted to each said cutout, each said lining member including a recess defined in an outer side thereof for engaging with a peripheral edge which defines the associated cutout.

2. The device according to claim 1, wherein the disc includes a handle member mounted thereon.

3. The device according to claim 1, wherein at least one plate of each base includes a plurality of holes defined therein, and further comprises a plurality of stop members for releasably extending through the holes to prevent rotation of the wheels.

* * * * *